(12) United States Patent
Hagny

(10) Patent No.: US 6,530,334 B2
(45) Date of Patent: Mar. 11, 2003

(54) DEPTH-LIMITED FURROW CLOSING ARRANGEMENT AND METHOD FOR NO-TILL AGRICULTURAL SEEDERS

(76) Inventor: Matthew P. Hagny, 1701 Osborne St., Salina, KS (US) 67401

(*) Notice: Subject to any disclaimer, the term of this patent is extended or adjusted under 35 U.S.C. 154(b) by 0 days.

(21) Appl. No.: 09/865,911

(22) Filed: May 24, 2001

(65) Prior Publication Data

US 2002/0174813 A1 Nov. 28, 2002

(51) Int. Cl.[7] .............................................. A01C 13/00
(52) U.S. Cl. ........................ 111/189; 111/193; 111/900; 111/927
(58) Field of Search ................................ 111/149, 150, 111/189, 190, 191, 193, 195, 924, 900, 927, 14, 62

(56) References Cited

U.S. PATENT DOCUMENTS

| | | | | |
|---|---|---|---|---|
| 1,259,826 A | * | 3/1918 | Bloom | |
| 4,213,408 A | | 7/1980 | West et al. | 111/85 |
| 4,275,670 A | | 6/1981 | Dreyer | 111/85 |
| 4,570,554 A | | 2/1986 | Clark | 111/85 |
| 4,702,323 A | | 10/1987 | Smit et al. | 172/156 |
| 4,991,660 A | | 2/1991 | Horvath et al. | 172/551 |
| 5,060,585 A | | 10/1991 | Alexander | 111/89 |
| 5,425,318 A | | 6/1995 | Keeton | 111/197 |
| 5,443,023 A | | 8/1995 | Carroll | 111/191 |
| 5,497,717 A | | 3/1996 | Martin | 111/191 |
| 5,595,130 A | | 1/1997 | Baugher et al. | 111/52 |
| 5,609,114 A | | 3/1997 | Barton | 111/167 |
| 5,619,939 A | | 4/1997 | Herman et al. | 111/163 |
| 5,676,429 A | | 10/1997 | Johnson et al. | 301/64.7 |
| 5,724,903 A | * | 3/1998 | Yoder et al. | |
| 5,727,638 A | * | 3/1998 | Wodrich et al. | |
| 5,752,454 A | | 5/1998 | Barton | 111/167 |
| 5,826,524 A | * | 10/1998 | Yoder | |
| 5,852,982 A | * | 12/1998 | Peter | |
| 5,878,678 A | * | 3/1999 | Stephens et al. | |
| 5,896,932 A | | 4/1999 | Bruns et al. | 172/556 |
| 5,970,891 A | | 10/1999 | Schlagel | 111/191 X |
| 5,970,892 A | * | 10/1999 | Wendling et al. | |
| 6,119,608 A | | 9/2000 | Peterson et al. | 111/192 |
| 6,216,616 B1 | * | 4/2001 | Bourgault | |
| 6,223,663 B1 | * | 5/2001 | Wendling et al. | |
| 6,314,897 B1 | * | 11/2001 | Hagny | |

* cited by examiner

Primary Examiner—Victor Batson
(74) Attorney, Agent, or Firm—Jeffrey L. Thompson; Thompson & Thompson, P.A.

(57) ABSTRACT

A seed firming and furrow closing system for no-till agricultural seeders has a smooth in-furrow firming device that gauges the depth and limits penetration of the closing wheel(s). The firming device is mounted behind a seed furrow opener, and one or more spoked closing wheels are rotatably mounted behind the firming device. Each closing wheel is mounted to a support member for the firming device. An adjustable stop is provided to control the operating depth of the closing wheel relative to the firming device. During operation, the firming device moves along the bottom of the furrow to firm the seeds, and the adjustable stop maintains a selected depth of the closing wheel relative to the firming device and the bottom of the furrow. A swivel assembly allows the firming device and closing wheels to swivel from side-to-side to better track the furrow when planting around a curve.

26 Claims, 7 Drawing Sheets

DEPTH-LIMITED FURROW CLOSING ARRANGEMENT AND METHOD FOR NO-TILL AGRICULTURAL SEEDERS

RELATED APPLICATIONS

The Applicant's copending application Ser. No. 09/432,455, which was filed on Nov. 2, 1999, and titled "FURROW CLOSING SYSTEM AND METHOD FOR NO-TILL AGRICULTURAL SEEDERS," is related to the subject matter of this application and is incorporated herein by reference.

BACKGROUND OF THE INVENTION

1. Field of the Invention

The present invention relates generally to agricultural seeders that produce open furrows in the soil into which seeds are placed, and more particularly to an improved furrow closing system that is depth-limited by linkages with a separate firming device so as to provide consistent closing of furrows in no-till conditions without the risk of disrupting seed placement.

2. Description of the Prior Art

Agricultural planting methods continue to improve in response to rapid worldwide adoption of no-till crop production techniques, in which the new crop's seeds are placed directly into the previous crop's stubble, also known as crop residues, and which consists of the stalks, straw and chaff left from the previous crop. No-till seeding differs greatly from seeding into a tilled seedbed. The soil conditions for no-till seeding will typically be more moist than those dried by tillage, due to the mulching effect of the crop residues remaining on the soil surface. Moist soils are more prone to compaction by implements traveling over or engaging the soil. No-till soils will also be more structurally stable than tilled soils, as the soil particles are "aggregated" or held together by old roots, fungi, and other organic material, which forms a matrix to hold the soil particles in place and naturally creates a highly porous but very resilient substrate. Agricultural seeders operating in no-till conditions are often built and operated so as to supply more down pressure (via springs and/or hydraulics) onto the furrow opening discs to aid in the slicing of old crop residues and to assist in the penetration of this more structured soil. The extra down pressure on the opener discs and depth-gauging wheels sometimes results in more compaction of the furrow sidewalls.

Especially in no-till, some difficulties are encountered when attempting to draw soil back into the furrow, which is desirable to protect the newly placed seeds from drying winds and sun, to protect from wildlife predation and damaging temperature fluctuations, to improve seedling uniformity of emergence and growth, and to improve seedling root establishment. In tilled soils, the most common method was to employ packing ("press") wheels rearward of the furrow openers; the packing wheels operated to both close the furrow and to do some amount of packing, since in the loose and dry tilled soils packing is desirable to assist the seed in drawing moisture from deeper in the soil. In no-till seeding, the wetter and more structured soils prevent packing wheels from performing adequately. The sidewall of the furrow formed in no-till seeding does not crumble easily like the sidewall in the tilled conditions, where the soil had previously been loosened and fluffed by tillage; accordingly, very high pressures are sometimes employed on the packing or closing wheels in an attempt to squeeze the furrow sidewalls back together. This typically results in poor seedling emergence—the seedling having great difficulty pushing itself through this dense layer of soil—as well as poor nodal or lateral root growth of emerged seedlings, since the compacted and "slickened" sidewall resists root penetration.

Some improvements in no-till seeding have been made by separating the seed firming and furrow closing functions; this is only possible where the depth-gauging function is already accomplished independently of the packing or closing wheel, as in the configuration where depth-gauging wheels travel alongside the furrow opening discs. Seeds that have been placed into the soil by the furrow openers and seed-directing tube are then firmed into the bottom of the furrow by either a narrow rolling wheel (typified by U.S. Pat. No. 5,676,429 to Johnson, although similar wheels have long been used in the industry) or a sliding-type firmer (U.S. Pat. No. 5,425,318 issued to Keeton) which travels along the bottom of the furrow "V" and exerts a slight amount of pressure onto the seeds and surrounding soil. Since the closing wheel is now relieved of its seed firming function, the closing wheel may be comprised of a spoked or tined shape to more aggressively slice or fracture the sidewall of the furrow.

Several spoked closing wheels types and methods have been disclosed in the prior art, including, for example, U.S. Pat. No. 5,443,023 issued to Carroll, U.S. Pat. No. 5,497,717 issued to Martin, and U.S. Pat. No. 5,896,932 issued to Bruns et al., as well as improvements made in the angles and alignments of the spokes as they enter the soil (Applicant's co-pending application Ser. No. 09/432,455). All of these spoked closing wheel arrangements regulate their depth by the shape and length of the spoke, the path of rotation of the spoke in relation to the furrow, as well as the weight of the wheel and its mounting bracket/arm and spring pressure exerted on the bracket/arm. The method described in the '455 application further limits depth by the angle of the spoke as it enters the soil in conjunction with its close alignment to the furrow.

Many aspects of the field's condition affect both the operating depth and furrow covering achieved by spoked closing wheels, such as changes in soil moisture level, amounts of stubble on the surface, soil texture, soil organic matter, soil structure, and amount of soil lifting or fluffing perpetrated by the opener disc or other devices. The operator must remain vigilant and continually adjust the down pressure on the closing wheels to achieve adequate furrow covering but yet not penetrate too far and disrupt seed placement. As a practical matter, this is extremely difficult to do as field conditions change frequently during the course of even a single pass with the seeding implement. While the method described in the '455 application mitigates these problems to a significant degree, the invention described herein will allow spoked wheels to be built of heavier materials or operated even more aggressively without concern of disrupting seed placement; i.e., the current invention opens the door for previously impractical or undesirable angles and alignments for the spokes of closing wheels.

In the current state of agricultural seeder manufacturing and usage, some dichotomy has arisen between "planters" and "grain drills" (or simply "drills"). The dichotomy is not particularly relevant to this application, except in the ease of describing the prior art in detail. For clarity, the term "planter" commonly refers to seeders with the capability of singulating seeds for each opener unit's placement, and typically with a relatively wide spacing between individual opener units ("opener unit" refers to the entire seed placement apparatus for one furrow, including not only the furrow opening device, but also seed-directing tube, gauge wheel, firming and closing devices, linkages, etc.). Virtually all planters have parallel linkages to attach the opener unit to the toolbar, which results in no changes in the angle of operation of the opener unit as it engages the soil on undulating terrain. Planters almost universally utilize two furrow-opening discs on each opener unit, mounted immediately adjacent to each other and in contact with each other at their lower leading edge, but slightly away from each other toward their upper and rearward edges, which allows for a seed-directing tube between them. Planters typically employ depth-gauging wheels on the outside of each opening disc. Planters often have a radially mounted vertically pivoting bracket mounted rearward of the opening discs; the bracket holding the closing wheels inclined at 20° to 24° from the vertical ("camber") and 0° from the direction of travel, and accommodating either smooth rubber wheels, beveled cast iron wheels, or any of the spoked wheels previously described.

Planters sometimes use a separate seed firming mechanism, such as a sliding-type firmer (the Keeton patent previously described) attached on or near the seed tube and projecting rearward of it (but ahead of the closing wheels), or a small-diameter (approximately 5") "seed-lock" wheel which is vertically mounted to run along the bottom of the furrow "V" behind the seed tube but ahead of the closing wheels. The separate firming devices that operate within the furrow are especially important for no-till seeding due to the poor performance of the closing wheels in achieving seed-to-soil contact in the structured and more resilient soils found in no-till, and the complete inability of many spoked closing wheel designs to supply any seed firming.

The term "grain drill" commonly refers to a seeder lacking the capability of seed singulation; instead the seed is metered volumetrically. Drills tend to have the opener units mounted to achieve narrow row spacing, although the openers may be mounted in a staggered pattern of two or more ranks on a single toolbar. Drills are manufactured employing a wide variety of furrow openers, including non-rolling openers referred to as "hoe," "knife" or "sweep" depending on the shape of the sliding shank component used, and both single- and double-disc openers. The sliding shank-type openers typically gauge their depth from packer or press wheels which are typically quite wide and operate rearward of the shank. Some disc-openers also gauge their depth from a press wheel, while other models use a gauge wheel alongside the opener much like the planter openers.

The disc-openers with gauge wheels alongside the opener create the opportunity for more precision in separated firming and closing functions. One popular drill with separate depth-gauging, seed firming, and furrow closing mechanisms is manufactured by Deere & Co., of Moline, Ill., and sold as the Model No. 750 and its derivatives, the 752, 1850, 1860, and 1560, and are described, for example, in U.S. Pat. No. 5,595,130 issued to Baugher. The 750-style opener unit is radially mounted to the drill's frame, which has some limitations as will be described. The 750-style opener has a vertical firming wheel with a semi-pneumatic rubber tire about 1" wide and 10" in diameter, which is intended to roll along the bottom of the furrow "V" (although it is slightly too wide to do so if the sidewall is firm and structured), and which is mounted on an arm which radially pivots vertically from its attachment point on the opener, slightly above and rearward of the disc hub. The 750-type opener has a separate closing wheel which operates slightly to the side of the furrow and at angles designed to squeeze part of the sidewall back into the furrow, and is mounted on an arm which also pivots radially (vertically) from its attachment point slightly above the firming wheel arm's attachment point; both the firming wheel arm and the closing wheel arm are independent of each other and attach directly to the opener subframe.

Another popular drill opener which is functionally similar to the 750-style is the SDX, marketed by Case-New Holland Global with U.S. headquarters at Racine, Wis. The SDX has a slightly narrower firming wheel than the 750-style opener, but otherwise is nearly identical in terms of the firming and closing wheel arrangement. The SDX is also radially attached to the drill frame.

Yet another drill opener with separate depth gauging and firming/closing functions is the Flexicoil Model F/SO opener marketed on a variety of toolbars. The F/SO combines the firming and closing functions in one solid rubber wheel adjustable in a small range of vertical and horizontal angles, approximately from 0° to 10° from vertical and 0° to 10° from direction of travel. The F/SO is attached to the toolbar via a parallel linkage, unlike the radial arrangements of the SDX and 750-style openers.

Hiniker Mfg. of Minnesota also produces a single-disc opener with separated depth gauging, seed firming, and furrow closing functions, where the firming is accomplished by a sliding-type firmer, and the closing is accomplished by a notched disc on a vertically pivoting radially mounted arm. This arrangement is described, for example, in U.S. Pat. No. 6,119,608 issued to Peterson et al. The Hiniker opener unit attaches to the toolbar via a parallel linkage.

On all of these planters and gauge-wheel type drills, the original closing wheels have often been replaced with spoked closing wheels to improve performance in structured no-till soils. The performance of such spoked closing wheels has varied considerably, depending on the exact design used, angles and alignment used, as well as soil conditions. Aggressiveness of the closing system has always been limited by the desire to avoid disrupting seed placement, there being no effective way of preventing the closing system from penetrating too far except by limiting the weight and down pressure exerted on the closing wheel, as well as the shape and length of the spokes on the wheel itself and the angles at which the spokes penetrate the soil. Furthermore, there has been some inadequacy of both the firming and closing wheels to track the furrow when seeding on the contour; this has been especially pronounced with firming wheels that taper to a very narrow edge.

SUMMARY OF THE INVENTION

The present invention provides an improved solution to the agronomic problems of furrow closure in no-till seeding, as previously discussed. By limiting the depth of the closing wheel as gauged by the firming wheel or other firming device running along the bottom of the furrow, a more aggressive closing system may be used, without the limitations on weight or down pressure in previous closing systems. The opener subframe on which the invention is attached is preferably mounted on a parallel linkage, rather than a radial pivot arm, to maintain a constant operating angle throughout its range of vertical movement. The firming wheel is also preferably attached to the opener subframe using a parallel linkage to maintain a constant operating angle throughout its range of vertical movement. Other mounting arrangements, such as a telescoping tube-within-a-tube assembly, can also be used to maintain the desired orientation.

The Applicant's invention utilizes a large-diameter firming wheel with a narrow tapered edge to allow it to fit into the bottom of the furrow "V." The firming wheel is rotatably attached to a stem, which is mounted on a parallel linkage rearward of the opener disc and seed directing tube; the parallel linkage may be downwardly biased by a spring or other arrangement for supplying some slight additional down pressure onto the firming wheel. The firming wheel's parallel linkage is preferably mounted to a swivel assembly (e.g., a kingpin) that allows the linkage and firming wheel to articulate or swivel laterally a few degrees independent of the opener subframe to allow the firming wheel to better track the furrow when seeding along a contour.

Attached to the firming wheel stem, rearward of the firming wheel parallel linkage, is the closing wheel arm. The closing wheel arm is radially mounted to pivot vertically, to facilitate clearing the wheel should straw or stalks become lodged between the closing wheel and the firming wheel; the arm may be downwardly biased by a spring or similar mechanism. An adjustable stop limits the downward travel available to the closing wheel arm—this is the essence of the invention, the control over the depth of the closing wheel accomplished by gauging from the firming wheel's depth, which is also the depth of the seed. In this way, the closing wheel can be very aggressive without risk of it penetrating too far and disrupting seed placement.

The present invention may be configured with either one or two closing wheels per furrow, depending on the configuration of the opener discs, the crop seeded, and soil conditions. There may be other ways of attaching the closing wheel and firming wheel to achieve similar results, which will be obvious to those skilled in the art based on the teachings herein.

According to a broad aspect of the present invention, an opener unit for an agricultural seeder is provided, comprising: an opener subframe; a furrow opener mounted to the opener subframe for making an open furrow in soil; a seed directing device for directing seeds into the open furrow; a firming assembly having a support member attached to the opener subframe, and a firming device mounted to the support member and arranged to roll or slide along a bottom of the open furrow behind the seed directing device; and at least one closing wheel assembly having a closing wheel arm attached to the support member, and a closing wheel rotatably mounted to the closing wheel arm and arranged to close the open furrow behind the firming device.

According to another broad aspect of the present invention, a seed firming and furrow closing system for agricultural seeders is provided, comprising: a firming assembly support member adapted to be attached to an opener subframe; a firming device mounted to the support member and arranged to roll or slide along a bottom of an open furrow behind a seed directing device; a first closing wheel arm attached to the support member; and a first closing wheel rotatably mounted to the closing wheel arm and arranged to close an open furrow behind the firming device.

According to yet another broad aspect of the present invention, a method of seeding an agricultural crop is provided, comprising the steps of: creating an open furrow in soil; placing seeds into the furrow; moving a firming device along a bottom of the furrow; and closing the furrow using a spoked closing wheel mounted behind the firming device, the closing wheel being connected to the firming device such that an operating depth of the closing wheel is dependent upon and limited by a depth of the furrow in which the firming device is moving.

BRIEF DESCRIPTION OF DRAWINGS

The present invention will become more clearly appreciated as the disclosure of the invention is made with reference to the accompanying drawings. In the drawings.

DETAILED DESCRIPTION OF PREFERRED EMBODIMENTS

Seed firming and furrow closing systems for no-till agricultural seeders according to preferred embodiments of the present invention will now be described in detail by reference to FIGS. 1 to 7 of the accompanying drawings.

Figure 1:
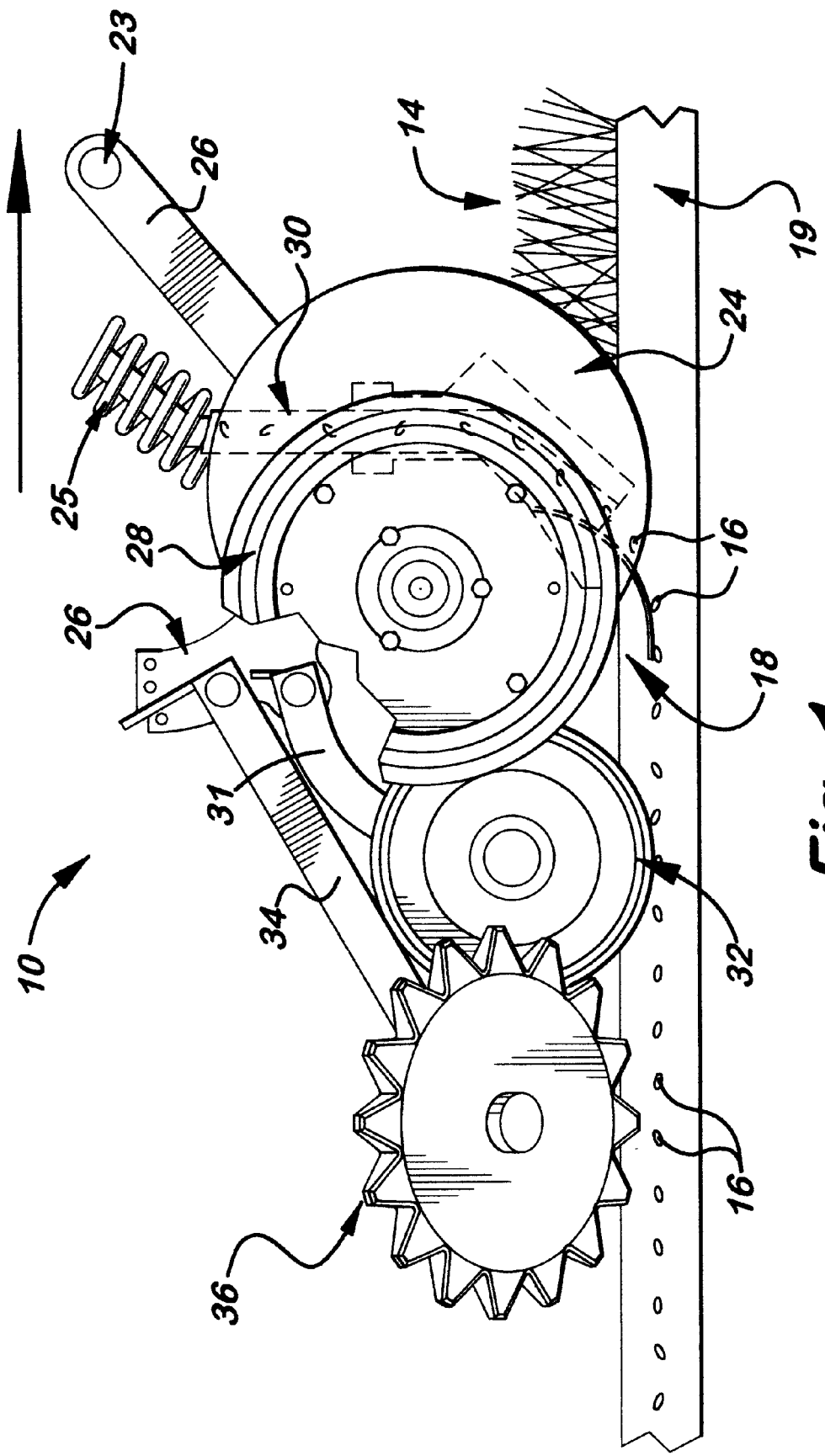
FIG. 1 is a side view of a prior art no-till drill opener unit utilizing a single-disc design with adjacent depth-gauging wheel, separate firming wheel, and separate and independent spoked closing wheel.

FIG. 1 is a side view of a common prior art no-till drill opener unit 10 (Deere & Company's 750-style previously described), which has the ability to place seeds in a soil 19 that has not been plowed or disced or otherwise tilled to loosen the soil and bury old crop residues 14 (also referred to as stubble). The opener unit 10 is attached to the frame or toolbar of the drill by means of an arm extending from and integral with the opener subframe 26 forward and upward to a single pivot point 23 on the drill frame or toolbar (not shown). The pivot point 23 allows the opener unit to move vertically in a radial manner when following undulations in the field. A coil spring 25 transfers down pressure from the toolbar to the opener subframe 26 and other opener components. This particular style of no-till opener unit consists of a single sharp-edged rotating opener disc 24, also known as an opener blade or coulter, operating at a slight angle to the direction of travel to pry open a furrow 18 in the soil 19 into which seeds 16 are dropped from a seed-directing tube 30.

The depth of the furrow is controlled by a depth-gauging wheel 28 typically operating in the same plane as the opener disc 24 and immediately adjacent to the disc 24, although slightly rearward. The seed-directing tube 30 is typically located on the side of the opener disc 24 opposite the depth-gauging wheel 28. The seed-directing tube 30 and/or boot serves to keep some loose soil and stubble out of the furrow 18 whilst the seeds 16 are directed to the bottom of the furrow 18.

Operating almost immediately rearward of the seed-directing tube 30 is a firming wheel 32 or other device that is narrow enough to fit within the furrow 18 and that pushes the seeds 16 into the soil at the bottom of the furrow 18. The firming wheel 32 is attached to the opener subframe 26 by means of a firming wheel arm 31 attached by a single pivot point which allows the firming wheel 32 to move vertically in a radial manner.

Rearward of the firming wheel 32 is a closing wheel 36 which is intended to return part of the soil comprising the furrow sidewall into the furrow 18 and cover the seed 16. The closing wheel 36 is attached to the opener subframe 26 by means of a closing wheel arm 34 again by a single pivot point which allows the closing wheel 36 to move vertically in a radial manner. The closing wheel 36 attaches to the arm 34 by way of a rotatable bearing (not shown). The closing wheel 36 is completely independent of the firming wheel 32, and the depth of the closing wheel 36 is not controlled except by the shape of the closing wheel 36 and the weight and down pressure exerted on the closing wheel arm 34. The prior art often uses smooth (non-spoked) closing wheels of solid cast-iron or with a hollow rubber ring fitted along the edge, but sometimes spoked wheels of various designs are employed, which are beneficial for closing a furrow in structured no-till soils but with the added risk of the spokes being too aggressive and disrupting seed placement.

Figure 2:
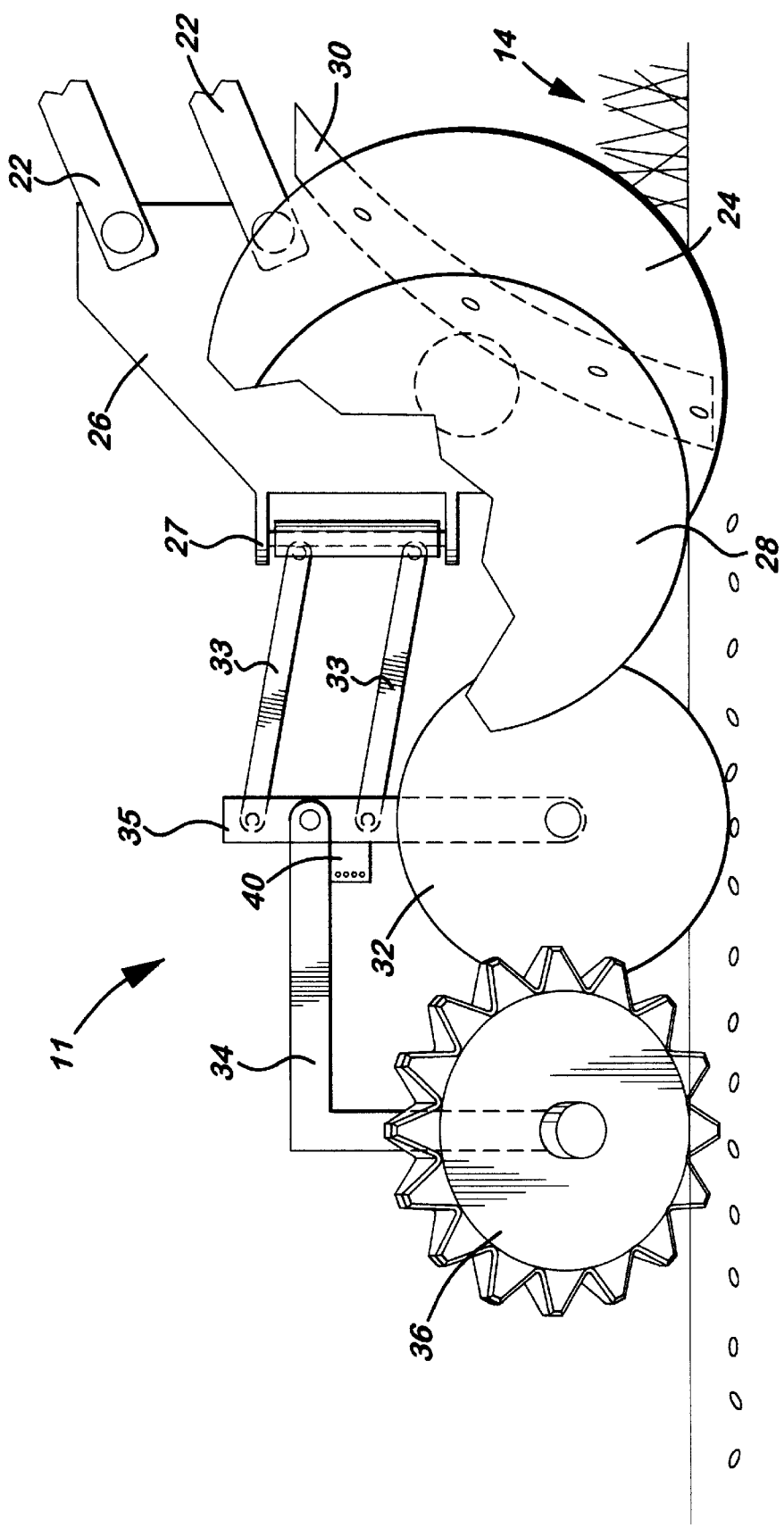
FIG. 2 is a side view of a no-till drill opener unit of single-disc design, but attached to the toolbar via parallel linkage, and with the arrangement of the closing wheel and firming wheel so that the depth of the closing wheel is limited per this invention.

FIG. 2 is a side view of a no-till drill opener unit 11, which has improved functionality over the opener unit 10 depicted in FIG. 1 and incorporates an embodiment of the Applicant's invention. The same reference numerals are used in FIG. 2 to depict various components that correspond to those shown in FIG. 1.

The opener unit 11 is attached to the toolbar (frame) of the drill with a parallel linkage 22. The linkage 22 may be equipped with coil springs, airbags, or hydraulic cylinders (not shown) for supplying down pressure onto the opener unit 11 for it to penetrate the soil. Other methods of attaching the opener unit 11 will be obvious to those skilled in the art. The advantage of a parallel linkage over a radial attachment for the opener unit 11 is that the parallel linkage 22 causes the remaining components of the opener unit 11 to maintain the same angles in relation to the soil surface throughout their range of motion. This improves the performance of the opener disc 24, gauge wheel 28, and seed tube 30, and helps achieve the optimum operation of the Applicant's invention.

FIG. 2 also depicts an integrated assembly of a firming wheel 32 and closing wheel 36 according to the Applicant's invention. The firming wheel 32 is mounted to a support member or stem 35 which is attached to the opener subframe 26 by a small parallel linkage 33, which controls the angle of the firming wheel stem 35 relative to the opener subframe 26. Alternatively, a vertically telescoping tube (FIG. 7) can be used to attach the stem 35 to the opener subframe 26. Since both the opener subframe 26 and the firming wheel stem 35 are attached by parallel linkages 22, 33 or other suitable devices to control their angles of operation during their respective vertical movements, the firming wheel stem 35 will remain at a constant angle (approximately perpendicular) in relation to the soil surface even as the opener subframe 26 and the firming wheel 32 move vertically to follow the undulations of the soil. This allows the closing wheel 36 to be attached to the firming wheel stem 35 in such a way as to gain control over the potential depth the closing wheel 36 achieves.

The closing wheel arm 34 is attached to the firming wheel stem 35 such that the closing wheel arm 34 can pivot radially in a vertical direction with its downward travel limited by an adjustable stop 40 which controls the depth to which the closing wheel 36 can penetrate. The closing arm 34 may be downwardly biased by a spring (not shown). Other methods of attaching the closing wheel 36 to the firming wheel 32 will be obvious to those skilled in the art, such as where the pivot of the closing arm 34 is eliminated and the closing arm 34 is permanently attached to the stem 35 at a pre-set depth.

In another variation, the firming wheel linkage 33 may be attached to the opener subframe 26 by means of a swivel assembly 27 (e.g., a kingpin) which allows the horizontal swiveling of the linkage 33, stem 35, firming wheel 32, closing wheel arm 34, and closing wheel 36 in such a manner as to allow these devices to better follow the furrow when seeding on the contour. The swivel assembly 27 allows the firming wheel 32 to stay in the furrow and steer itself as well as the closing wheel(s) 36. Other methods of attaching the firming wheel 32 to the opener subframe 26 will be obvious to those skilled in the art.

Figure 3:
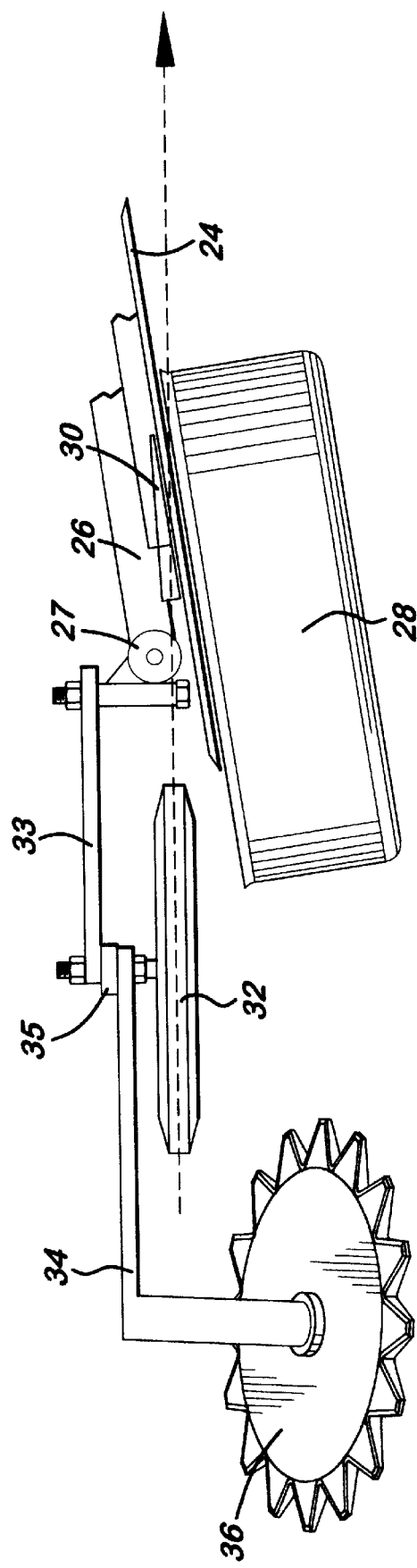
FIG. 3 is a top plan view of the opener depicted in FIG. 2.

FIG. 3 is a top view of the drill opener and one preferred embodiment of the type depicted in FIG. 2 and described in the preceding text.

Figure 4:
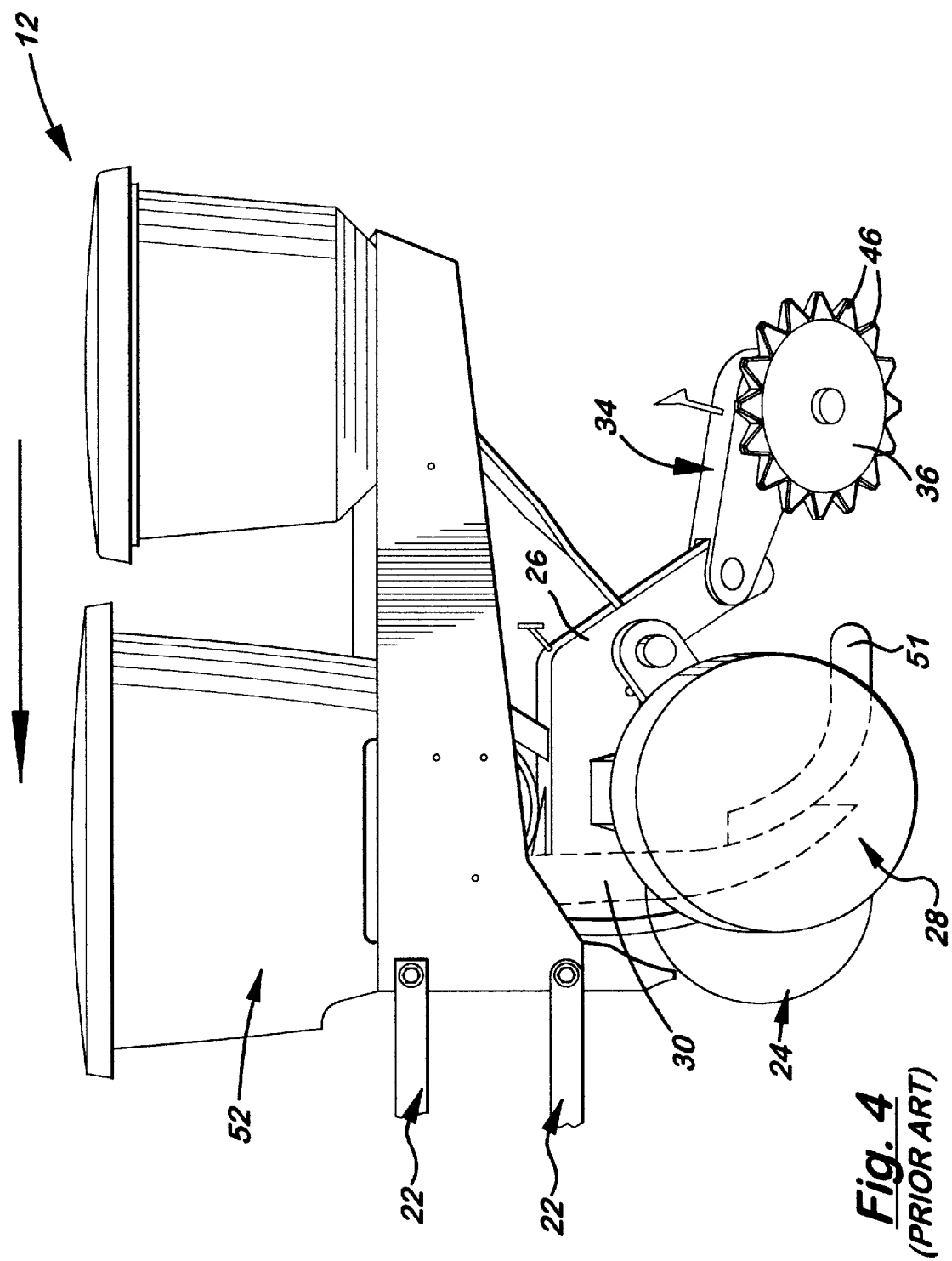
FIG. 4 is a side elevational view of a planter opener unit with prior art seed firming and furrow closing arrangements.

FIG. 4 is a side view of a common planter opener unit 12, utilizing a prior art seed firming and closing system. The planter opener unit 12 is attached to the frame or toolbar of the planter by means of a parallel linkage 22 with springs or other devices (not shown) for supplying down pressure to penetrate the old crop residues and soil. The planter opener unit 12 functions similarly to the drill unit 10 depicted in FIG. 1, with the exception that planter unit 12 typically employs two opener discs 24 that are in contact with each other at the lower leading edge but slightly gapped at the upper and rearward edges to allow a seed-directing tube 30 to pass between them and which guides seeds to the bottom of the furrow 18. Planter opener units usually have two depth-gauging wheels 28, one alongside each opener disc 24. A seed hopper 52 is also shown which carries a supply of seed to be delivered to the furrow through the seed tube 30.

A sliding seed firming mechanism 51 on the planter opener unit 12 performs the same function as the firming wheel 32 on the drill opener unit 10. Alternatively, a small diameter (approximately 4 to 5-inch) "seed-lock" wheel (not shown) is sometimes used to perform this function (note that in some configurations the separate firming mechanism is omitted—both the firming and closing functions are performed by smooth or tined closing wheels operating alongside the furrow which compress the sidewall downward starting from the soil surface; however, this method usually performs poorly in no-till). Rearward of the firming mechanism 51, the closing wheel 36 is mounted from a bracket 34 which has the ability to pivot vertically and radially about a single point located on a subframe of the opener unit 12 immediately rearward of the opener discs 24.

Figure 5:
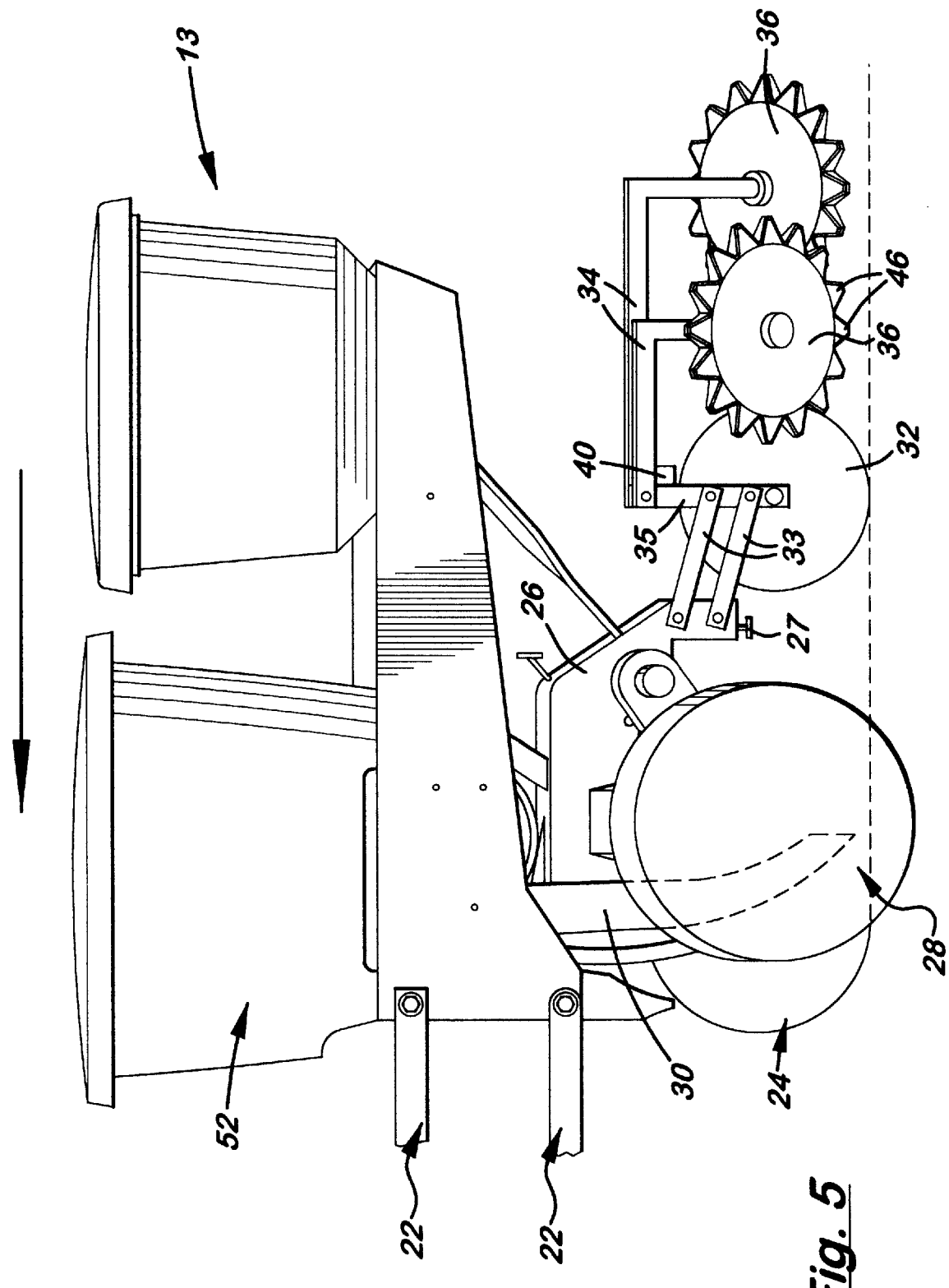
FIG. 5 is a side elevational view of a planter opener unit with the arrangement of the closing wheels and firming wheel so that the depth of the closing wheels is limited per this invention.

FIG. 5 is a side view of a planter unit 13 according to another embodiment of the Applicant's invention. The same reference numerals are used in FIG. 5 to depict various components that correspond to those shown in FIGS. 3 and 4.

As in FIG. 2, the firming wheel 32 shown in FIG. 5 gauges the depth for the closing wheel 36, but with the difference that two closing wheels 36 per opener unit 13 are used, with each closing wheel 36 on its own radially attached arm 34. On single-disc opener units such as are commonly used on no-till drills, one spoked closing wheel may be highly consistent in closing the furrow. On double-disc opener units, the soil is pried in two directions to form the furrow; to replace all of the soil to its approximate pre-planted location requires two spoked closing wheels shattering both sidewalls, the agronomic importance of which has been previously described. Depending on the type of closing wheel system used, it is often beneficial to have the closing wheels 36 located in a staggered pattern, that is, one ahead of the other, and some distance apart for residue and mud clearance. The closing wheels 36 may be on separate arms 34 independent of one another, or together on the same arm, so long as the operating depth of each closing wheel 36 is limited by a stop 40. The stop 40 is preferably adjustable to change the operating depth of the closing wheels 36 to a plurality of different settings.

Figure 6:
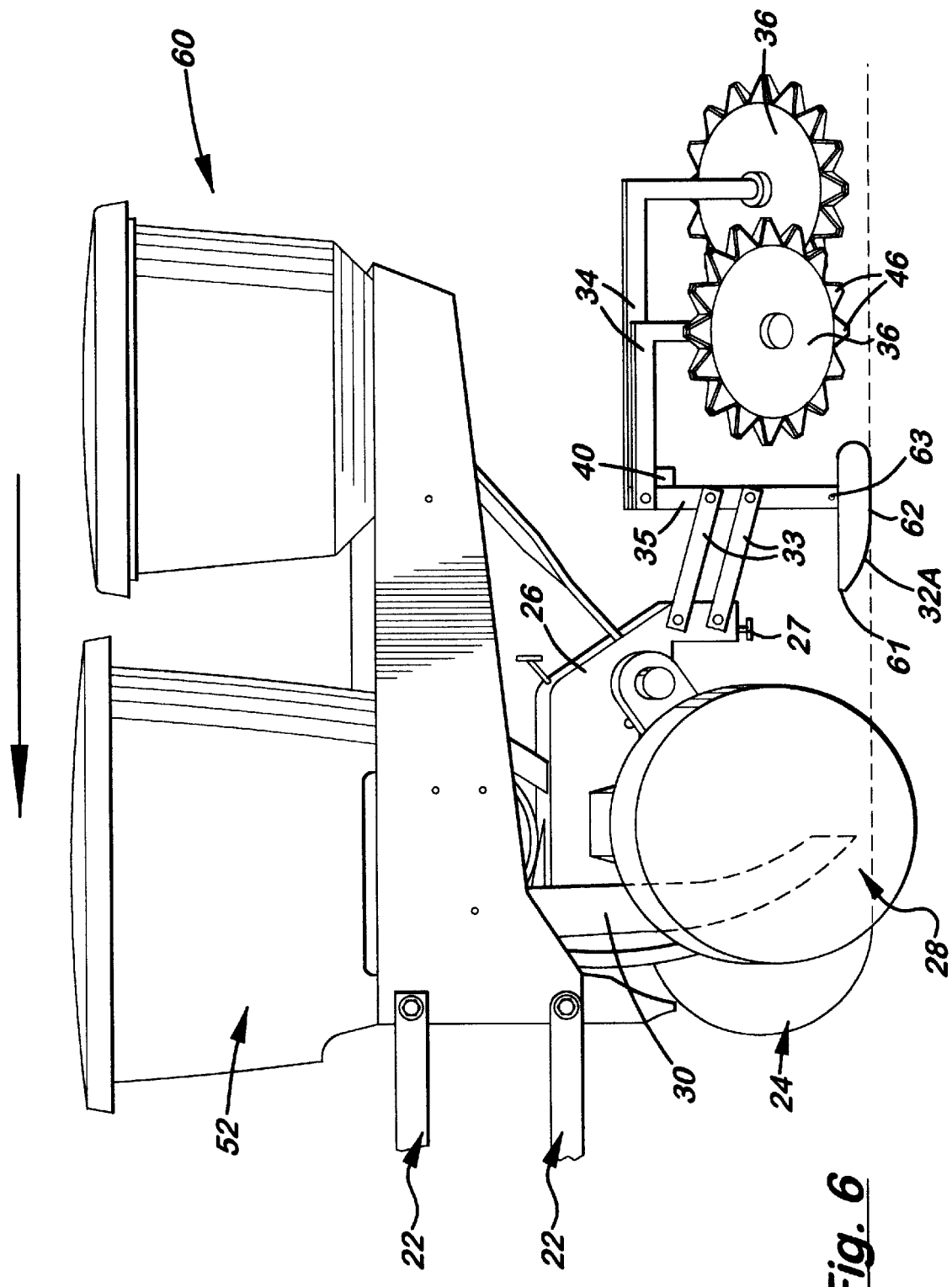
FIG. 6 is a side elevational view of a planter opener unit with a sliding-type firmer and depth-limited furrow closing arrangement of the present invention.

FIG. 6 is a side view of a planter unit 60 according to another embodiment of the Applicant's invention. The same reference numerals are used in FIG. 6 to depict various components that correspond to those shown in the embodiments described above.

FIG. 6 shows a planter opener unit 60 equipped with a narrow, skid-shaped firmer 32A arranged to slide along the bottom of the open furrow. The firmer 32A has a leading surface that slopes downwardly and rearwardly from a front point 61 to a lower edge 62. The sloped leading surface allows the firmer 32A to slide easily across the bottom of the open furrow to press seeds gently into the bottom of the furrow. The firmer 32A is pivotally mounted to the lower end of the stem 35 about a horizontal transverse axis 63 to better follow undulations in the bottom surface of the furrow. A pair of closing wheel arms 34 are pivotally attached to the upper end of the stem 35 to support a pair of closing wheels 36 in the same manner described above. An adjustable stop 40 is provided for each of the closing wheel arms 34 to limit the operating depth of each closing wheel 36 based on the operating depth of the firmer 32A. The firmer 32A can be used as the firming device instead of the firming wheel 32 in any of the embodiments described herein.

Figure 7:
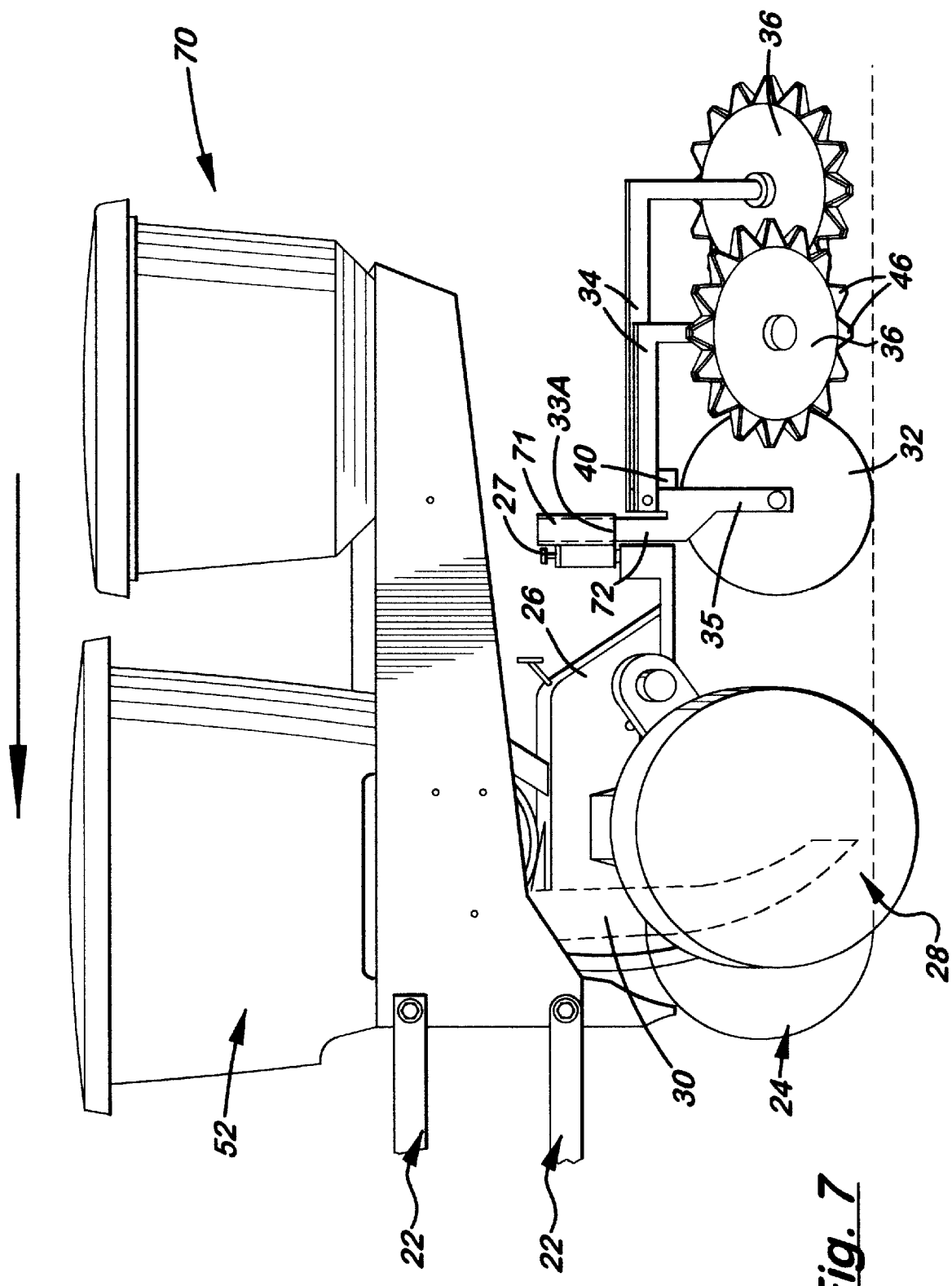
FIG. 7 is a side elevational view of a planter opener unit with a telescoping tube mounting arrangement for mounting the firming wheel and closing assembly of the present invention.

FIG. 7 is a side view of a planter opener unit 70 according to another embodiment of the Applicant's invention. The same reference numerals are used in FIG. 7 to depict various components that correspond to those shown in other embodiments described above.

FIG. 7 shows a planter opener unit 70 having a telescoping tube mounting arrangement 33A for mounting the stem 35 of the firming assembly to the opener subframe 26. The telescoping tube mounting arrangement 33A includes a vertically oriented tubular member 71 that slidably receives a vertically oriented portion 72 of the stem 35. The tubular member 71 allows vertical movement of the firming wheel 32 relative to the opener subframe 26 without changing the angles of operation of the firming wheel stem 35 and the closing wheels 36.

A swivel assembly 27 is used to attach the telescoping mounting arrangement 33A to the opener subframe 26. The swivel assembly 27 allows horizontal swiveling of the telescoping mounting arrangement 33A, stem 35, firming wheel 32, closing wheel arms 34, and closing wheels 36 to better follow curves in the furrow when seeding on the contour.

In a variation of this embodiment, the swivel assembly 27 can be incorporated into the telescoping mounting arrangement 33A to provide swiveling movement about the same vertical axis along which the stem 35 slides during vertical movement. It is also noted that the firming wheel 32 in this embodiment can be replaced with a sliding skid-shaped firmer 32A, as shown in FIG. 6, to accomplish generally the same result.

In a further variation of the embodiments described above, the closing wheels 36 can be equipped with a depth-limiting band or bulge (not shown) attached to or formed integral with each wheel and extending concentrically around a mid portion of the wheel. The depth-limiting band would function to roll along a top surface of the soil and prevent penetration of the teeth of the closing wheel 36 beyond a predetermined depth.

In a still further variation of the embodiments described above, the closing wheel assembly can be modified to include a treader wheel (not shown) that trails behind the closing wheel(s) with the closing wheel arm(s) suspended from the linkage between the in-furrow firming device and the treader wheel. In this embodiment, the operating depth of the closing wheel(s) would be based on a precise average of the depth of the furrow in front of the closing wheel(s) and the soil surface behind the closing wheel(s). As in the embodiments described above, this embodiment relies, at least in part, on the operating depth of the in-furrow firming device for the depth control of the closing wheel(s).

The depth-limited furrow closing arrangements described above have several significant advantages over the prior art. For example, a more aggressive design of the closing wheel is possible because depth is limited by other means; heavier materials can be used in the construction of the closing wheel because depth is limited by other means; the firming and closing mechanisms provide superior performance because their tracking and alignment to the furrow is self-regulated; and mud adhesion to the firming wheel can be reduced because it will no longer be forced into the furrow sidewall when seeding along a curve.

While the invention has been specifically described in connection with specific embodiments thereof, it is to be understood that this is by way of illustration and not of limitation, and the scope of the appended claims should be construed as broadly as the prior art will permit.

What is claimed is:

1. An opener unit for an agricultural seeder, comprising:
   an opener subframe;
   a furrow opener mounted to said opener subframe for making an open furrow in soil;
   a seed directing device for directing seeds into the open furrow;
   a firming assembly having a support member attached to said opener subframe, and a firming device mounted to said support member and arranged to move along a bottom of the open furrow behind said seed directing device, said support member and said firming device being movable vertically relative to said opener subframe; and
   at least one closing wheel assembly having a closing wheel arm attached directly to said support member, and a closing wheel rotatably mounted to said closing wheel arm and arranged to close the open furrow behind said firming device.

2. The opener unit for an agricultural seeder according to claim 1, wherein said closing wheel arm is pivotally attached to said support member.

3. The opener unit for an agricultural seeder according to claim 2, further comprising a depth limiting stop arranged to limit an operating depth of the closing wheel based on an operating depth of the firming device.

4. The opener unit for an agricultural seeder according to claim 2, further comprising an adjustable stop member attached to the support member and engageable with the closing wheel arm to adjust an operating depth of the closing wheel relative to the firming device.

5. The opener unit for an agricultural seeder according to claim 1, further comprising a depth controlling means for controlling an operating depth of the closing wheel based on an operating depth of the firming device.

6. The opener unit for an agricultural seeder according to claim 1, wherein said support member is rotatably attached to said opener subframe by a parallel linkage that pivots about generally horizontal axes to allow relative vertical movement between said firming assembly and said opener subframe.

7. The opener unit for an agricultural seeder according to claim 6, further comprising a swivel assembly arranged between a front end of said parallel linkage and said opener subframe, said swivel assembly having a generally vertical pivot axis that allows horizontal steering movement of the firming assembly and the closing wheel along the furrow.

8. The opener unit for an agricultural seeder according to claim 1, wherein said support member is attached to said opener subframe using a vertically oriented telescoping member that allows vertical movement of said firming assembly relative to said opener subframe.

9. The opener unit for an agricultural seeder according to claim 1, further comprising a swivel assembly arranged between said support member of said firming assembly and said opener subframe, said swivel assembly having a generally vertical pivot axis that allows horizontal steering movement of the firming assembly and the closing wheel along the furrow.

10. The opener unit for an agricultural seeder according to claim 1, wherein said at least one closing wheel assembly comprises a pair of closing wheel assemblies each having a closing wheel arm pivotally attached to said support member of said firming assembly, said pair of closing wheel assemblies being independently movable relative to each other.

11. The opener unit for an agricultural seeder according to claim 1, wherein said firming device is a firming wheel arranged to roll along the bottom of the open furrow.

12. The opener unit for an agricultural seeder according to claim 1, wherein said firming device is a skid-shaped firmer arranged to slide along the bottom of the open furrow.

13. An agricultural seeder comprising a main frame and a plurality of opener units attached to said main frame, said opener units each having the structure set forth in claim 1.

14. The agricultural seeder according to claim 13, wherein said opener units are each attached to said main frame by a respective parallel linkage.

15. A seed firming and furrow closing system for agricultural seeders, comprising:
   a firming assembly support member adapted to be attached to an opener subframe;
   a firming device mounted to said support member and arranged to move along a bottom of an open furrow behind a seed directing device;
   a first closing wheel arm attached to said support member; and
   a first closing wheel rotatably mounted to said first closing wheel arm and arranged to close an open furrow behind the firming device, said first closing wheel arm being attached to said firming assembly support member such that an operating depth of the first closing wheel is dependent upon a depth at which the firming device is operating.

16. The seed firming and furrow closing system according to claim 15, wherein said firming device comprises a smooth wheel with a narrow tapered edge rotatably mounted to said support member about a horizontal axis.

17. The seed firming and furrow closing system according to claim 15, wherein said firming device comprises a skid-shaped firmer arranged to slide along the bottom of the open furrow.

18. The seed firming and furrow closing system according to claim 15, wherein said closing wheel arm is pivotally connected to said support member, and a depth limiting stop is arranged between said closing wheel arm and said support member to limit an operating depth of the closing wheel based on an operating depth of the firming device.

19. The seed firming and furrow closing system according to claim 15, wherein said support member is mounted to a linkage that allows vertical movement of said support member, said linkage having a swivel assembly that allows horizontal steering movement of the firming device and the closing wheel about a generally vertical axis.

20. The seed firming and furrow closing system according to claim 15, wherein said support member is mounted to a parallel linkage that allows vertical movement of said support member.

21. The seed firming and furrow closing system according to claim 15, wherein said support member is mounted to a telescoping assembly that allows vertical movement of said support member.

22. The seed firming and furrow closing system according to claim 15, further comprising a second closing wheel arm attached to said support member, and a second closing wheel rotatably mounted to said second closing wheel arm and arranged to close an open furrow behind the firming device, and wherein said first and second closing wheel arms are pivotally attached to said support member and independently movable relative to each other.

23. A method of seeding an agricultural crop, comprising the steps of:
   creating an open furrow in soil;
   placing seeds into said furrow;
   moving a firming device along a bottom of the furrow; and
   closing the furrow using a spoked closing wheel mounted behind the firming device, the closing wheel being connected to the firming device such that an operating depth of the closing wheel is dependent upon an operating depth of the firming device in the furrow.

24. The method according to claim 23, wherein said step of moving a firming device comprises rolling a firming wheel along a bottom of the furrow.

25. The method according to claim 23, further comprising the step of placing an adjustable stop between the firming device and the closing wheel to control the operating depth of the closing wheel.

26. The method according to claim 23, wherein said step of moving a firming device comprises sliding a narrow skid-shaped firmer along the bottom of the furrow.

* * * * *